Figures 8, 9:
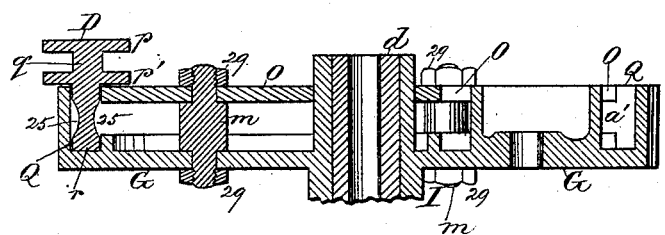

(No Model.) 3 Sheets—Sheet 1.
J. P. TOLMAN.
MACHINE FOR MAKING CORDAGE, &c.
No. 340,835. Patented Apr. 27, 1886.
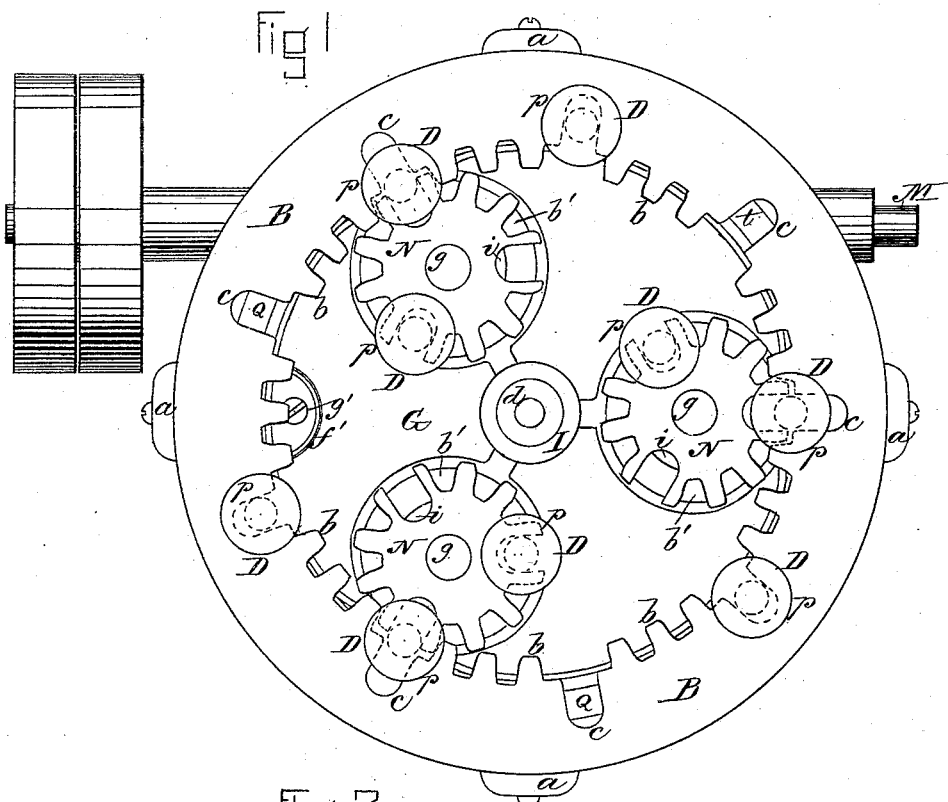
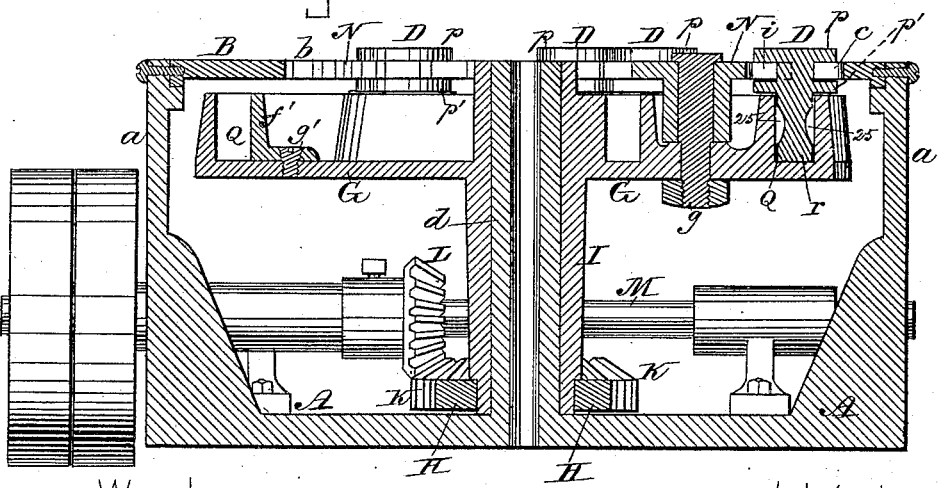
WITNESSES
INVENTOR (No Model.) 3 Sheets—Sheet 2.
J. P. TOLMAN.
MACHINE FOR MAKING CORDAGE, &c.
No. 340,835. Patented Apr. 27, 1886.
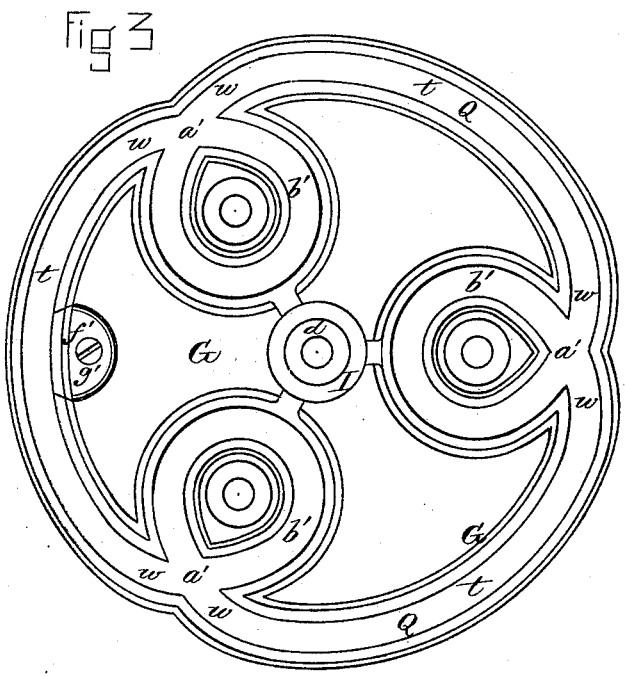
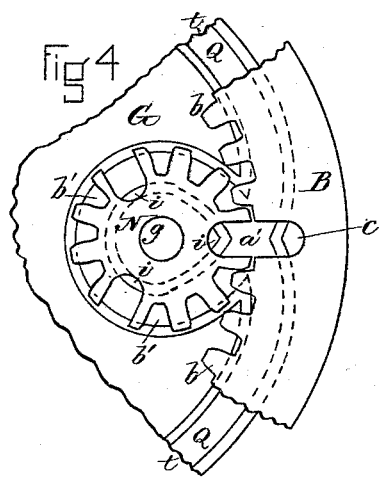
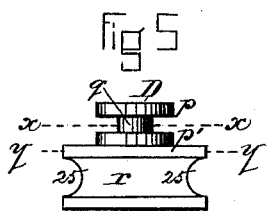
WITNESSES
INVENTOR (No Model.) 3 Sheets—Sheet 3.

J. P. TOLMAN.
MACHINE FOR MAKING CORDAGE, &c.

No. 340,835. Patented Apr. 27, 1886.

WITNESSES
INVENTOR

UNITED STATES PATENT OFFICE.

JAMES P. TOLMAN, OF WEST NEWTON, MASSACHUSETTS.

MACHINE FOR MAKING CORDAGE, &c.

SPECIFICATION forming part of Letters Patent No. 340,835, dated April 27, 1886.

Application filed January 4, 1886. Serial No. 187,634. (No model.)

*To all whom it may concern:*

Be it known that I, JAMES P. TOLMAN, a citizen of the United States, residing at West Newton, in the county of Middlesex and State of Massachusetts, have invented certain new and useful Improvements in Machines for Making Cordage, &c., of which the following is a full, clear, and exact description, reference being had to the accompanying drawings, making part of this specification, in which—

Figure 1 is a plan of my improved machine, the spool-frames and spools being removed, and the travelers in their various positions being indicated by disks. Fig. 2 is a vertical section through the center of the same. Fig. 3 is a plan of the revolving table or platform, with the travelers and carrier-gears removed therefrom, showing the form of the continuous cam-groove or pathway through which the feet of the travelers are moved as the said table is rotated. Fig. 4 is a plan of a portion of the top of the machine with the travelers removed. Fig. 5 is an elevation of the base or lower portion of one of the travelers. Fig. 6 is a horizontal section on the line $x\ x$ of Fig. 5. Fig. 7 is a horizontal section on the line $y\ y$ of Fig. 5. Fig. 8 is a plan representing a modification of the revolving table or platform shown in Fig. 3. Fig. 9 is a vertical section of the same, showing one of the travelers in place.

My invention relates to that class of machines in which the strands for forming a cord or webbing are to be united by an interlocking twist, and in which the travelers carrying the spools upon which the strands are wound have an intermittent motion, being at times held in position by a stationary toothed guide-ring or traveler-holding plate, and at other times moved by carrier-gears around circular recesses in a plate or table upon which said gears revolve to new positions in such guide-ring.

The machines in principal use heretofore for making cordage in this manner are described in Letters Patent of the United States No. 56,485, granted to James A. Bazin, July 17, 1866; No. 232,920, granted to Charles E. Barnes, October 5, 1880, and No. 276,201, granted to myself, April 24, 1883. All of these machines are provided with some form of traveler-selectors consisting in one case of sliding plates operated by a cam, in another of pivoted jaws operated by a cam, and in the third of switch-levers operated by springs, the object in all cases being to direct the projecting feet of the travelers into their proper places in a main revolving table or platform provided with a circular track extending around its periphery, and a series of smaller circular tracks or recesses connected with this peripheral track, the projecting feet of the travelers, which move in and upon these tracks, being directed at appropriate times into and out of the said recesses by means of the above-named traveler-selectors, thus determining the paths in which the travelers move, and causing the strands which they carry to form an interlocking twist, as desired. These various forms of traveler-selectors all require a number of moving parts, with more or less complication in the mechanism for operating them. In order that these traveler-selectors may assume their various positions with sufficient rapidity, their range of motion is made small, involving the construction of travelers having very small feet. There is, therefore, considerable danger of breaking the feet of these travelers, and the speed of the machine is limited by the necessity of avoiding severe shocks upon them. Moreover, as the feet of the travelers become worn thin and the bearing parts of the traveler-selectors wear loose, sufficient lost motion is produced to render the action of the parts uncertain, and the travelers may be directed into the recesses in the table at the wrong times, or fail to be directed therein at the proper times, in either case causing two travelers to come together and stop the machine, with great danger of also breaking some of the parts. The cost of building these machines is also very considerable, as there are a great number of moving parts, which require to be machine-finished and accurately fitted.

The object of my present invention is to greatly simplify the construction of machines of this class by entirely dispensing with all traveler-selecting devices and providing a continuous track for the feet of the travelers, whereby it shall be impossible for them to move in any other than the right path, thus greatly diminishing the number of moving parts, and correspondingly reducing the cost of the machine, at the same time permitting the use of travelers with large feet, making a higher rate of speed safe in operating the machine.

To this end my invention consists in the combination, with spool-carrying travelers, of a guide-ring or traveler-holding plate having notches or recesses for receiving and holding the necks of such travelers, notched heads or carrier-gears for moving the travelers from one position to another in said guide-ring, and a revolving plate or cam-table having a continuous endless cam-groove or pathway for directing the feet of the travelers, such groove being so curved as to cross itself at suitable points, and to move the travelers in proper succession from the notches in the guide-ring into the notches in the carrier-gears, and at the proper times return them into other notches in the said guide-ring without the aid of switches or other traveler-selecting devices or accessories, as hereinafter more particularly set forth.

In the said drawings, A represents the frame of the machine, in which is secured the guide-ring or traveler-holding plate B, which is supported by the uprights $a$ of the frame. This guide-ring B is provided on its inner periphery with teeth $b$, of which certain ones at regular intervals are cut away and replaced by radial notches or recesses $c$, which receive and hold the necks of the travelers D.

G is the main revolving table or platform, which is located beneath the guide-ring and receives motion through the gear H, secured to the lower end of a sleeve, I, connected with the platform and revolving around a main spindle, $d$, rising from the frame A, this spindle being preferably made hollow, to permit the passage of a core or center for the cord, if such should be required. The gear H engages with a spur and bevel-gear, K, which is mounted on a vertical stud (not shown) and meshes with a bevel-gear, L, on a driving-shaft, M, as seen in Fig. 2, and thus as the latter is rotated the platform G is revolved, as required.

N are the carrier-gears or notched heads, which are arranged in the same plane with the guide-ring B, and are revolved around studs $g$, rising from the table G. These carrier-gears are rotated by their teeth engaging with the teeth of the guide-ring B as the platform G is revolved, and at suitable intervals the spaces between the teeth of the gears N are properly shaped to form radial notches, as seen at $i$, for receiving the necks of the travelers.

The table or platform G is provided with a continuous endless cam-groove or pathway, Q, for directing the feet of the travelers D, which fit therein, as seen in Fig. 2.

The base of each traveler is composed of two disks, $p\ p'$, a cylindrical neck, $q$, and a projecting foot-piece, $r$, of the form seen in Figs. 2, 5, and 7. This foot-piece, which is of considerable length, is preferably cut away or grooved out, as seen at 25, for the purpose of securing lightness and reducing the amount of bearing-surface in contact with the walls of the cam-groove, and thereby diminishing the friction of the parts.

In practice the upper disk of the traveler-base carries the spool-frame, and there is placed above the whole machine a suitable take-off mechanism for taking off the finished cord and winding it up or conveying it away; but these devices are not shown, as they form no part of my present invention, and may be, for instance, similar to those shown in the United States Patent of Wm. H. Defrees, No. 153,320, dated July 21, 1874.

The cam-groove Q of the table G is of the form seen in Fig. 3, portions $t$ being located near the outer edge or periphery of the table, and other portions, $w$, being curved inward and crossing each other at $a'$ in such manner as to form a series of loops or approximately circular portions, $b'$, which lie beneath the carrier-gears N. These loops, which may be circular or oval, lie within a circle passing through the outer portions, $t$, and extend inward toward the center of the table.

When the foot-piece $r$ of a traveler is in one of the peripheral portions $t$ of the cam-groove, the neck $q$ of the traveler is held in the outer end of one of the radial notches $c$ of the guide-ring above it. As the table is rotated, the foot-piece $r$ passes into one of the inwardly-curving portions $w$ of the groove, thus causing the traveler to approach the center of the machine and its neck $q$ to move in the notch $c$ until such time as the foot-piece $r$ reaches a crossing-point $a'$, when the neck $q$ leaves the notch $c$ of the guide-ring and is delivered into one of the notches $i$ of a carrier-gear, which is at that moment in position to receive it. As the rotation of the table is continued, the neck $q$ of the traveler being now held in the notch $i$ of the carrier-gear, the foot-piece $r$ is carried by the rotation of the carrier-gear around a circular portion, $b'$, of the cam-groove until such time as the notch $i$, containing the neck $q$ of the traveler, again comes opposite one of the notches $c$ of the guide-ring, when the foot-piece $r$, having reached the crossing-point $a'$ of the groove, the traveler is delivered to a new position in another of the notches $c$ of the guide-ring, and thus as the table is rotated the travelers, whose feet lie at all times within the cam-groove, are caused to pass at the proper times from their respective positions of rest in the notches $c$ of the guide-ring B into the notches $i$ of the carrier-gears N, by which they are carried around the looped portions $b'$ of the cam-groove, as described, and then delivered to new positions of rest in the guide-ring, where they are allowed to remain temporarily until again taken up by another carrier-gear, and so on entirely around the guide-ring.

No switches or other accessory devices are required to direct the feet of the travelers into and out of the looped or smaller circular portions $b'$ of the cam-groove, as the shape of the traveler-feet is such as to insure the travelers taking their proper course in passing into and out of the said looped portions $b'$, and in this manner the desired result is accomplished with mechanism of the simplest character, and the cost of the machine and wear of the parts are reduced to a minimum, while the machine can be run at will in either direction without any adjustment whatever, which is oftentimes a great advantage. It will also be seen that with the construction above described the feet of the travelers are large and solid, and consequently free from liability to become broken or worn thin, thus rendering it possible to run the machine safely at a high rate of speed, while the length of the feet causes the travelers to be held rigidly and firmly in a vertical position, and enables them to successfully resist any tendency to be inclined inward toward the center of the machine by the pull or strain of the strands upon the spool-frames, whereby they are prevented from becoming loose or unsteady in their positions.

A small portion, $f'$, of the table G is made removable, to allow of the insertion and withdrawal of the travelers, and is held in place by means of a screw, $g'$.

The machine here represented contains nine travelers, each carrier-gear N having three radial notches or spaces, $i$, between its teeth, for the reception of the necks of the travelers; but these carrier-gears N may be provided with any uneven number of these radial notches or spaces $i$, and the number of travelers varied accordingly. The number of carrier-gears and looped portions $b'$ of the cam-groove Q corresponding thereto, as also the number of the radial notches $c$ in the guide-ring B, may also be varied according to the character or description of cord to be made.

The carrier-gears or notched heads N are here shown as operated by engagement with the toothed ring B; but, if preferred, they may be rotated in any other suitable manner, similar, for instance, to that shown in the United States Patent of Chas. E. Barnes, No. 232,920, dated October 5, 1880, or in the United States Patent of Chas. E. Barnes and Ammi C. Winn, No. 290,624, dated December 18, 1883.

In Figs. 8 and 9 is represented a modification of the construction of the table G.

Owing to the great depth required for the groove Q, occasioned by the necessity of giving sufficient support to the travelers to keep them rigid and erect, difficulty is experienced in making castings in which the walls of the groove shall be smooth. I therefore very much reduce the height of the inner wall of the groove, forming it with simply sufficient height to give a bearing, against which the bottom part of the traveler-foot may rest, as seen in Fig. 9, and place a plate, O, above the table G, supported and adjusted by studs $m$ and nuts 29, so that its upper surface shall be even with the upper edge of the outer wall of the groove Q, and so shaped that its outer edge shall coincide with the inner wall of the groove. The foot of a traveler will thus when in any position be supported on the outside by the outer wall of the groove, and on the inside at the bottom by the low inner wall of the groove, and at the top by the edge of the plate O, which corresponds with the wall of the groove below it. I therefore in this manner avoid the difficulty of casting a deep and narrow groove, and at the same time do not diminish the support given to the travelers.

What I claim as my invention, and desire to secure by Letters Patent, is—

1. A revolving table or platform, G, having a continuous endless cam-groove or pathway, Q, curved to cross itself at suitable points and form loops or circular portions $b'$, lying within the circle of the outer or peripheral portions, and provided with notched carrier gears or heads N, in combination with the guide-ring or traveler-holding plate B and means for revolving the table or platform G, substantially as and for the purpose set forth.

2. The combination, with a series of spool-carrying travelers provided with feet, and a guide-ring or traveler-holding plate having notches or recesses for receiving and holding the necks of the travelers, of a revolving table or platform and means for rotating the same, said table or platform having a continuous endless cam-groove or pathway for directing the feet of the travelers, and notched carrier gears or heads mounted on said table or platform for moving the travelers from one position to another in said guide-ring, the cam-groove being so curved as to cross itself at suitable points and form loops or circular portions lying within the circle of the outer or peripheral portions, whereby the travelers are moved in proper succession from the notches in the guide-ring into the notches in the carrier-gears, and at the proper times returned into other notches in the said guide-ring without the aid of switches or other traveler-selecting devices or accessories, substantially as described.

3. A revolving table or platform provided with a continuous endless cam-groove or pathway, Q, having peripheral portions $t$ and inwardly-curved portions $w$, crossing each other at $a'$ and forming loops or circular portions $b'$, lying within the circle of the outer portions, $t$, in combination with means for rotating said table or platform, and a series of intermittingly-moving spool-carrying travelers, a guide-ring or traveler-holding plate having notches or recesses for receiving and-holding the necks of the travelers, and notched carrier gears or heads mounted on the revolving table or platform over the portions $b'$ of the cam-groove, and adapted to move the travelers from one position of rest to another in said guide-ring and around the portion $b'$ of the cam-groove, substantially as and for the purpose set forth.

Witness my hand this 28th day of December, A. D. 1885.

JAMES P. TOLMAN.

In presence of—
P. E. TESCHEMACHER,
W. J. CAMBRIDGE.